US012630364B2

(12) United States Patent
Lin et al.

(10) Patent No.: US 12,630,364 B2
(45) Date of Patent: May 19, 2026

(54) GOODS STORAGE METHOD AND APPARATUS, ROBOT, WAREHOUSING SYSTEM, AND STORAGE MEDIUM

(71) Applicant: HAI ROBOTICS CO., LTD., Shenzhen (CN)

(72) Inventors: Han Lin, Shenzhen (CN); Jui-chun Cheng, Shenzhen (CN)

(73) Assignee: HAI Robotics Co., Ltd., Shenzhen (CN)

( * ) Notice: Subject to any disclaimer, the term of this patent is extended or adjusted under 35 U.S.C. 154(b) by 492 days.

(21) Appl. No.: 18/320,412

(22) Filed: May 19, 2023

(65) Prior Publication Data

US 2023/0286752 A1     Sep. 14, 2023

Related U.S. Application Data

(63) Continuation of application No. PCT/CN2021/131013, filed on Nov. 16, 2021.

(30) Foreign Application Priority Data

Nov. 20, 2020    (CN) .......................... 202011315356.6

(51) Int. Cl.
  B65G 1/137        (2006.01)
  G05D 1/00         (2006.01)
(52) U.S. Cl.
  CPC ......... B65G 1/1373 (2013.01); G05D 1/0212 (2013.01); G05D 1/0238 (2013.01)
(58) Field of Classification Search
  CPC ...... B65G 1/1373; B65G 1/0492; B65G 1/04; B65G 1/137; B65G 1/14; G05D 1/0212;
  (Continued)

(56) References Cited

U.S. PATENT DOCUMENTS 3,826,349 A      7/1974  Stevenson
10,399,778 B1 *  9/2019  Shekhawat .......... B65G 1/1373
              (Continued)

FOREIGN PATENT DOCUMENTS

CA        2564664 A1    4/2008
CN      108423355 A     8/2018
              (Continued)

OTHER PUBLICATIONS

International Search Report mailed Feb. 10, 2022; PCT/CN2021/131013.

*Primary Examiner* — Justin Holmes

(74) *Attorney, Agent, or Firm* — Slater Matsil, LLP

(57)     ABSTRACT

A goods storage method and apparatus, a robot, a warehousing system, and a storage medium are provided. The method includes: moving to a position corresponding to a first target region according to a storage instruction of goods to be stored, where the first target region is a storage region corresponding to the goods to be stored, and the first target region is determined according to size information of the goods to be stored and a dynamic goods storage space on a rack corresponding to the goods to be stored; moving toward a direction of an unoccupied region in the first target region, in a case that the first target region is occupied; and placing the goods to be stored in a second target region, where the second target region is a corresponding storage region after the robot moves.

18 Claims, 10 Drawing Sheets

Move to a position corresponding to a first target region, according to a storage instruction of goods to be stored — S301

Move toward a direction of an unoccupied region in the first target region, in the case that the first target region is occupied — S302

Place the goods to be stored in a second storage region — S303

(58) Field of Classification Search
CPC .. G05D 1/0238; G05D 1/0246; G05D 1/0274;
G05D 1/0282; B25J 11/008; B25J 5/007;
G06Q 10/087
See application file for complete search history.

(56) References Cited

U.S. PATENT DOCUMENTS

| | | | |
|---|---|---|---|
| 10,752,442 B2 | 8/2020 | Shekhawat et al. | |
| 2012/0029687 A1 | 2/2012 | Hagen et al. | |
| 2014/0308098 A1 | 10/2014 | Lert et al. | |
| 2020/0156868 A1 | 5/2020 | Bidram et al. | |

FOREIGN PATENT DOCUMENTS

| | | | | |
|---|---|---|---|---|
| CN | 109573449 A | | 4/2019 | |
| CN | 109592280 A | | 4/2019 | |
| CN | 111348361 A | | 6/2020 | |
| CN | 111620024 A | | 9/2020 | |
| CN | 111661546 A | | 9/2020 | |
| CN | 111661548 A | | 9/2020 | |
| CN | 111792249 A | * | 10/2020 | ........... B65G 1/0485 |
| CN | 111801288 A | | 10/2020 | |
| CN | 112407727 A | | 2/2021 | |
| EP | 1627830 A1 | | 2/2006 | |
| EP | 2876614 A1 | | 5/2015 | |
| EP | 3142085 A1 | | 3/2017 | |
| EP | 3712815 A1 | | 9/2020 | |
| JP | 6738112 B2 | * | 6/2020 | ........... B25J 9/1679 |
| WO | WO2020150106 A1 | | 7/2020 | |

* cited by examiner

GOODS STORAGE METHOD AND APPARATUS, ROBOT, WAREHOUSING SYSTEM, AND STORAGE MEDIUM

CROSS-REFERENCE TO RELATED APPLICATIONS

The present disclosure is a continuation of International Patent Application No. PCT/CN2021/131013 filed on Nov. 16, 2021, which claims priority to Chinese Patent Application No. 202011315356.6 filed with the China National Intellectual Property Administration on Nov. 20, 2020 and entitled "GOODS STORAGE METHOD AND APPARATUS, ROBOT, WAREHOUSING SYSTEM, AND STORAGE MEDIUM", the disclosures of which are herein incorporated by references in their entireties.

TECHNICAL FIELD

The present disclosure relates to the technical field of intelligent warehousing, and in particular to a goods storage method and apparatus, a robot, a warehousing system, and a storage medium.

BACKGROUND

A robot-based intelligent warehousing system uses an intelligent operating system. The intelligent storage system realizes automatic retrieve and storage of goods through system instructions, and can work around the clock without a break, which replaces manual management and operation, thereby improving the efficiency of warehousing. Therefore, the intelligent storage system has been widely applied and favored.

In response to the intelligent warehousing system receiving a task of storing goods, the warehousing management device of the intelligent warehousing system generally allocates the corresponding storage location for the goods, and then the robot carries the goods to the storage location, thereby completing the goods storage.

However, due to human error, or measurement error caused by the warehousing system or the robot, there is the situation where the pre-selected storage location for the goods is occupied when the goods are placed. In the related art, the storage condition of each storage location is determined by manual routine inspection, so that when the goods are put into storage, the goods are directly placed with no need to detect the storage location. Since no real-time detection is performed on the storage condition of the storage location, there is a relatively high storage risk.

SUMMARY

The present disclosure provides a goods storage method and apparatus, a robot, a warehousing system, and a storage medium. The robot performs real-time detection on whether the region is occupied, and in the case that the region is occupied, the robot automatically adjusts its position, to place the goods in the adjusted region, thereby improving the safety of goods storage and the efficiency of handling abnormalities.

According to a first aspect, an embodiment of the present disclosure provides a goods storage method, including: moving to a position corresponding to a first target region according to a storage instruction of goods to be stored, where the first target region is a storage region corresponding to the goods to be stored, and the first target region is determined according to size information of the goods to be stored and a dynamic goods storage space on a rack corresponding to the goods to be stored; moving toward a direction of an unoccupied region in the first target region, in a case that the first target region is occupied; and placing the goods to be stored in a second target region, where the second target region is a corresponding storage region after the robot moves.

Optionally, the method further includes: detecting the first target region, to obtain a first detection result; and determining that the first target region is occupied according to the first detection result.

Optionally, the first target region is detected base on a sensor.

Optionally, the sensor includes at least one of an ultrasonic sensor, a laser sensor, a two-dimensional (2D) camera, and a three-dimensional (3D) camera.

Optionally, the determining that the first target region is occupied, according to the first detection result includes: determining whether a central axis, a first end or a second end of a carrying apparatus of the robot in a goods pick-and-place direction is obstructed, according to the first detection result; and determining that the first target region is occupied, in a case that any one of the central axis, the first end and the second end is obstructed.

Optionally, the method further includes: determining whether there is an obstacle in the first target region, in a case that none of the central axis, the first end and the second end is obstructed; and determining that the first target region is occupied, in a case that there is an obstacle in the first target region.

Optionally, the moving toward a direction of an unoccupied region in the first target region, in a case that the first target region is occupied includes: determining a first unoccupied region in the first region and a second unoccupied region in the second region, in the case that the first target region is occupied, where the first region is a region in the first target region located on a left side of the central axis of the carrying apparatus, the second region is a region in the first target region located on a right side of the central axis of the carrying apparatus, and an orientation of the carrying apparatus is the goods pick-and-place direction; and moving a target movement distance toward a direction of the first unoccupied region or the second unoccupied region.

Optionally, the moving the target movement distance toward the direction of the first unoccupied region or the second unoccupied region includes: moving the target movement distance toward the direction of the first unoccupied region, where an area of the first unoccupied region is greater than or equal to the area of the second unoccupied region; or moving the target movement distance toward the direction of the second unoccupied region, where the area of the second unoccupied region is greater than or equal to the area of the first unoccupied region.

Optionally, the moving toward a direction of an unoccupied region in the first target region, in a case that the first target region is occupied includes: determining, in the case that the first target region is occupied, and the central axis of the carrying apparatus of the robot is obstructed by an obstacle, a first distance between a first edge of the obstacle and the central axis and a second distance between a second edge of the obstacle and the central axis, where the orientation of the carrying apparatus is the goods pick-and-place direction; and moving the target movement distance toward the direction where the first edge of the obstacle is located, where the first distance is less than or equal to the second distance.

Optionally, the moving toward a direction of an unoccupied region in the first target region, in a case that the first target region is occupied includes: moving, in the case that the first target region is occupied, and a first end of a carrying apparatus of the robot is obstructed when a second end of the carrying apparatus is not obstructed, a target movement distance toward a direction where the second end is located, where an orientation of the carrying apparatus is a goods pick-and-place direction.

Optionally, the target movement distance is determined according to an edge position of an obstacle on the robot moving direction side, where the obstacle is an object occupying the first target region.

Optionally, the placing the goods to be stored in a second target region includes: obtaining a storage condition of the goods to be stored; and placing the goods to be stored in the second target region, in a case that the second target region meets the storage condition of the goods to be stored.

Optionally, the method further includes: generating storage abnormal information, in a case that the second target region fails to meet the storage condition of the goods to be stored.

Optionally, before placing the goods to be stored in the second target region, the method further includes: obtaining a second detection result of a current storage region after the movement is completed or during the movement, where the current storage region is a corresponding storage region after the movement is completed or during the movement; and determining that the current storage region is the second target region, in a case that the current storage region meets the storage condition of the goods to be stored.

Optionally, after placing the goods to be stored in the second target region, the method further includes: obtaining storage information of the goods to be stored, and transmitting the storage information, where the storage information includes the position information of the second target region.

Optionally, moving to the position corresponding to the first target region according to the storage instruction of the goods to be stored, the method further includes: identifying the position information of the reference point corresponding to the first target region or a second target region; and adjusting the position of the robot according to the position information of the reference point.

Optionally, the reference point includes one or more of a column of the rack corresponding to the first target region or the second target region, adjacent goods with a known position in a preset range of the first target region or the second target region, and a marking point in a preset range of the first target region or the second target region.

According to a second aspect, an embodiment of the present disclosure provides a goods storage apparatus, including: a first moving module, configured to move to a position corresponding to a first target region according to a storage instruction of goods to be stored, where the first target region is a storage region corresponding to the goods to be stored, and the first target region is determined according to size information of the goods to be stored and a dynamic goods storage space on a rack corresponding to the goods to be stored; a second moving module, configured to move toward a direction of an unoccupied region in the first target region, in a case that the first target region is occupied; and a goods placement module, configured to place the goods to be stored in a second target region, where the second target region is a corresponding storage region after the robot moves.

According to a third aspect, an embodiment of the present disclosure further provides a robot, including a carrying apparatus and at least one processor. The carrying apparatus is configured to place goods to be stored on a rack. The least one processor is configured to perform the goods storage method according to any embodiment in the first aspect of the present disclosure.

According to a fourth aspect, an embodiment of the present disclosure further provides a warehousing system, including the robot according to any embodiment in the third aspect of the present disclosure, and a warehousing management device. The warehousing management device is configured to generate a storage instruction. The robot is configured to place goods according to the storage instruction.

According to a fifth aspect, an embodiment of the present disclosure further provides a computer-readable storage medium. The computer-readable storage medium stores computer executable instructions. The computer executable instructions, when being executed by a processor, implements the goods storage method provided by any embodiment in the first aspect of the present disclosure.

According to a sixth aspect, an embodiment of the present disclosure further provides a computer program product, including a computer program. The computer program, when being executed by a processor, implements the goods storage method provided by any embodiment in the first aspect of the present disclosure.

The goods storage method and apparatus, the robot, the warehousing system, and the storage medium provided herein are applied to the warehousing system based on dynamic configuration of the goods storage space. The robot moves to the position corresponding to the first target region according to the storage instruction, and before placing the goods, performs real-time detection on the first target region. In the case that the first target region is determined to be occupied, the robot moves toward the direction of the unoccupied region, to obtain the second target region after the movement, and places the goods in the second target region, which realizes real-time detection on the region where the goods are stored, thereby improving the safety of goods storage. In addition, in the case that the region is occupied, the robot automatically moves, to obtain a new unoccupied region for storing the goods. As such, under the abnormal situation where the region is occupied, the corresponding processing policy is automatically determined, to successfully store the goods, thereby improving the efficiency of goods storage and the intelligence of the robot.

BRIEF DESCRIPTION OF THE DRAWINGS

The accompanying drawings here, which are incorporated into the specification and constitute a part of the specification, illustrate embodiments that conform to the present disclosure and are used together with the specification to explain the principles of the present disclosure.

Specific embodiments of the present disclosure are shown by the above drawings, and more detailed description will be given below. These drawings and text description are not for limiting the scope of the concept of the present disclosure in any way, but for illustrating the concept of the present disclosure for those skilled in the art by referring to specific embodiments.

DETAILED DESCRIPTION

Exemplary embodiments are described in detail herein, and examples of the exemplary embodiments are shown in the accompanying drawings. When the following description involves the accompanying drawings, unless otherwise indicated, the same numerals in different accompanying drawings represent the same or similar elements. The implementations described in the following exemplary embodiments do not represent all implementations consistent with the disclosure. On the contrary, they are merely examples of apparatuses and methods consistent with some aspects of the disclosure as detailed in the appended claims.

The technical solutions of the present disclosure and how the technical solutions solve the above technical problems are described in detail in the specific embodiments. The following several specific embodiments may be combined with each other, and the same or similar concepts or processes may not be described repeatedly in some embodiments. The embodiments of the present disclosure are described below with reference to the accompanying drawings.

The application scenario of the embodiments of the present disclosure is described below. The present disclosure is applied to the scenario of dynamic configuration of the goods storage space. The present disclosure provides a goods storage method based on the dynamic configuration of the goods storage space, which is different from a goods storage method with fixed storage location.

The dynamic configuration of the goods storage space refers to that, after determining the goods to be stored, the system allocates, according to the size of the goods, a first storage space adapted to the size of the goods from the currently unoccupied space. The unoccupied space may be a space with any size. The unoccupied space does not include the fixed storage location that has been divided. The first storage space can accommodate the goods to be stored. The fixed storage location refers to the pre-set storage location in a warehouse. The fixed storage location has a fixed position and a determined size.

The dynamic goods storage space may be the space that is obtained through the dynamic configuration of the goods storage space.

Exemplarily, the dynamic configuration of the goods storage space includes at least a one-dimensional configuration mode and/or a two-dimensional configuration mode.

Figure 1A:
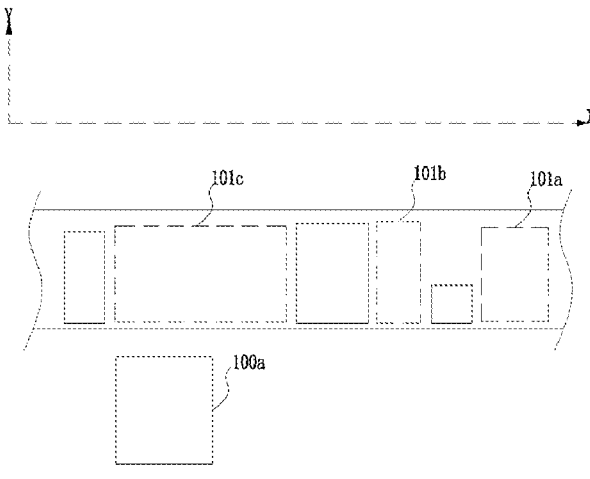
FIG. 1A is a schematic diagram of a storage condition in a one-dimensional configuration mode according to an embodiment of the present disclosure.

Exemplarily, FIG. 1A is a schematic diagram of a storage condition in the one-dimensional configuration mode according to an embodiment of the present disclosure. With reference to the X-Y coordinate system, the one-dimensional configuration mode refers to that the goods on each shelf in the goods storage space can only be placed in one row in the depth Y direction. In the one-dimensional configuration mode, the goods storage space includes a first unoccupied space and/or a first occupied space. Specifically, the first occupied space is the space where goods have been placed in the goods pick-and-place direction.

Figure 1B:
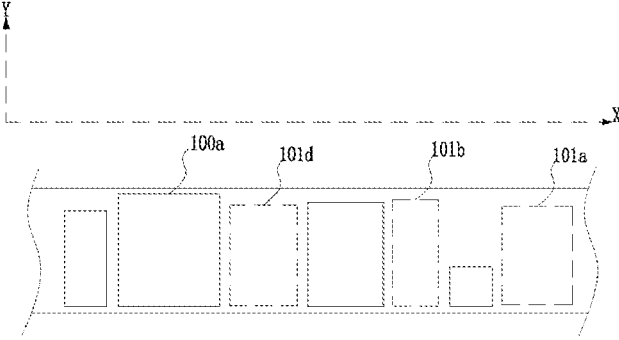
FIG. 1B is a schematic diagram of a storage condition after the goods are placed according to an embodiment shown in FIG. 1A.
Figure 1C:
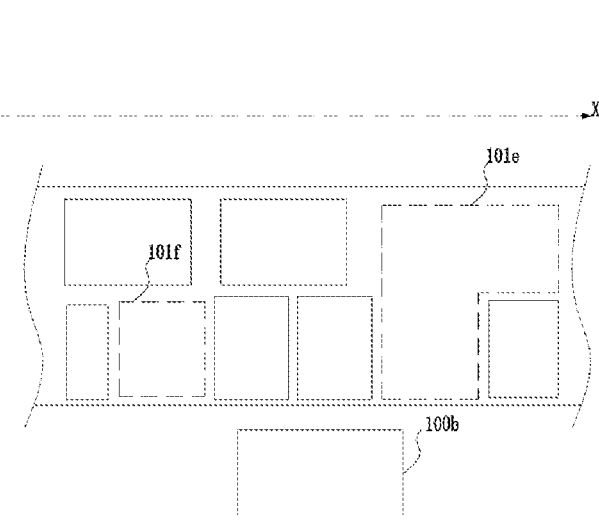
FIG. 1C is a schematic diagram of a storage condition in a two-dimensional configuration mode according to an embodiment of the present disclosure.

Exemplarily, FIG. 1C is a schematic diagram of the storage condition in the two-dimensional configuration mode according to an embodiment of the present disclosure. With reference to the X-Y coordinate system, the two-dimensional configuration mode refers to that the goods on each shelf in the goods storage space may be placed in one row, multiple rows, or in a mixed manner of one row and multiple rows in the depth Y direction. That is, in the two-dimensional configuration mode, the goods in the goods storage space are allowed to be placed in multiple rows in the depth Y direction. In the two-dimensional configuration mode, the goods storage space includes a second unoccupied space and/or a second occupied space. Specifically, the second unoccupied space includes the space that is not occupied by goods in the goods pick-and-place direction.

For example, FIG. 1A is a schematic diagram of the storage condition in the one-dimensional configuration mode according to an embodiment of the present disclosure. In the one-dimensional configuration mode, as shown in FIG. 1A, the unoccupied spaces based on the dynamic configuration of the goods storage space are the spaces 101*a*, 101*b* and 101*c* in FIG. 1A. After confirming the goods to be stored 100*a*, the system finds the first storage space that is most suitable for the goods 100*a*, such as the space 101*c*, from the unoccupied spaces, namely the spaces 101*a*, 101*b* and 101*c*.

FIG. 1B is a schematic diagram of the storage condition after the goods are placed according to the embodiment shown in FIG. 1A. As shown in FIG. 1B, after the goods 100*a* are placed, the current unoccupied spaces are the spaces 101*a*, 101*b* and 101*d*. The space 101*d* is a new unoccupied space after the space 101*c* is partially occupied by the goods 100*a*.

FIG. 1C is a schematic diagram of the storage condition in the two-dimensional configuration mode according to an embodiment of the present disclosure. As shown in FIG. 1C, in the two-dimensional configuration mode, the unoccupied spaces on the rack are the spaces 101*e* and 101*f* as shown in FIG. 1C. After confirming the goods to be stored 100*b*, the system finds the first storage space that is most suitable for the goods 100*b*, such as space 101*c*, from the spaces that have never be occupied, namely the space 101*e* and the space 101*f*.

Figure 1D:
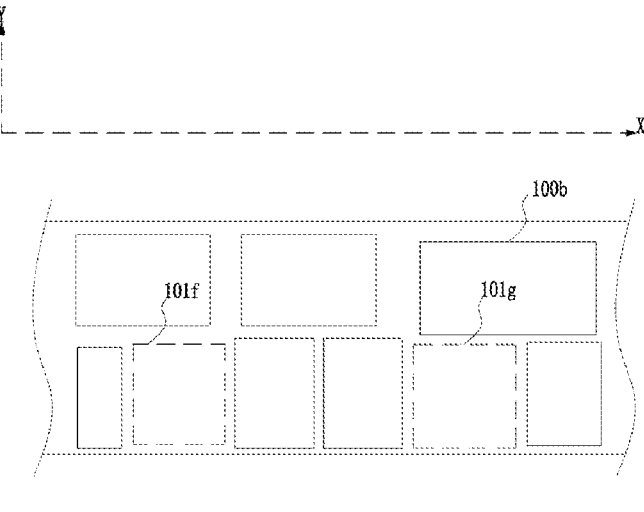
FIG. 1D is a schematic diagram of a storage condition after the goods are placed according to an embodiment shown in FIG. 1C.

FIG. 1D is a schematic diagram of the storage condition after the goods are place according to the embodiment corresponding to FIG. 1C. As shown in FIG. 1D, after placing the goods 100*b*, the current unoccupied spaces are the space 101*f* and the space 101*g*. The space 101*g* is a new unoccupied space after the space 101*e* is partially occupied by the goods 100*b*.

Figure 1E:
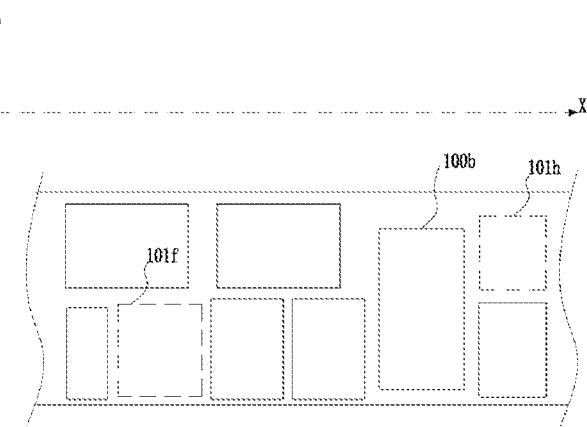
FIG. 1E is a schematic diagram of a storage condition after the goods are placed according to an embodiment shown in FIG. 1C.

FIG. 1E is a schematic diagram of the storage condition after the goods are place according to the embodiment corresponding to FIG. 1C. Referring to FIG. 1C, FIG. 1D and FIG. 1E, the goods 100*b* are placed in different orientations in FIG. 1D and FIG. 1E. That is, the goods 100*b* can be turned when being placed, that is, the orientation of the goods to be stored can be changed when being placed. After the goods 100*b* are placed, the current unoccupied spaces are the space 101*f* and the space 101*h*. The space 101*h* is a new unoccupied space after the space 101*e* is partially occupied by the goods 100*b*.

Figure 1F:
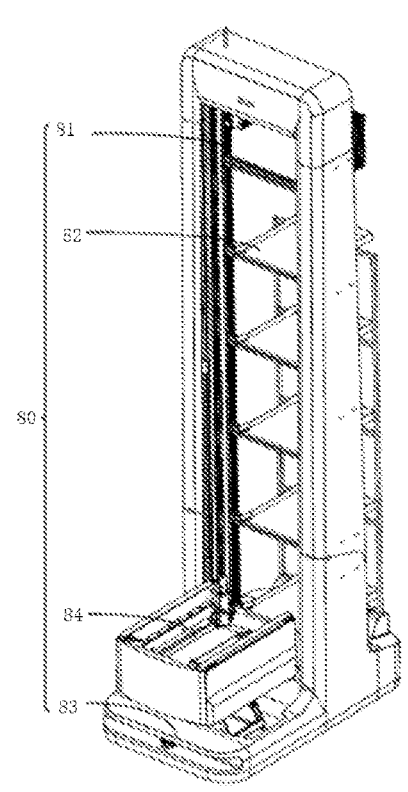
FIG. 1F is a schematic structural diagram of a robot according to an embodiment of the present disclosure.

Exemplarily, FIG. 1F is a schematic structural diagram of a robot according to an embodiment of the present disclosure. As shown in FIG. 1F, the transport robot 80 includes a mobile chassis 83, a storage rack 82, a carrying apparatus 84, and a lifting/lowering assembly 81. The storage rack 82, the carrying apparatus 84 and the lifting/lowering assembly 81 are all mounted to the mobile chassis 83. In addition, a plurality of storage units are set on the storage rack 82. The lifting/lowering assembly 81 is configured to drive the carrying apparatus 84 to move up and down, to allow the carrying apparatus 84 to be aligned with any storage unit on the storage rack 82, or be aligned with a rack and/or goods. The carrying apparatus 84 is rotatable in the vertical direction as an axis for orientation adjustment, to be aligned with the storage unit, or be aligned with the rack and/or the goods. The carrying apparatus 84 is configured to load or unload goods, so as to transport the goods between the rack and the storage unit.

Exemplarily, the storage rack 82 may be selectively set or not set. In the case that the storage rack 82 is not set, when the robot 80 transports goods, the goods are stored in the accommodating space of the carrying apparatus 84.

The robot 80 in the foregoing embodiments can perform the goods storage method according to the present disclosure, to transport goods between the shelving unit and a workstation.

When the robot 80 performs the task of storing goods, the robot 80 moves to the position of the storage space where the goods are designated, and carries the goods from the storage unit of the storage rack 82 to the rack by the lifting/lowering assembly 81 in cooperation with the carrying apparatus 84.

Figure 1G:
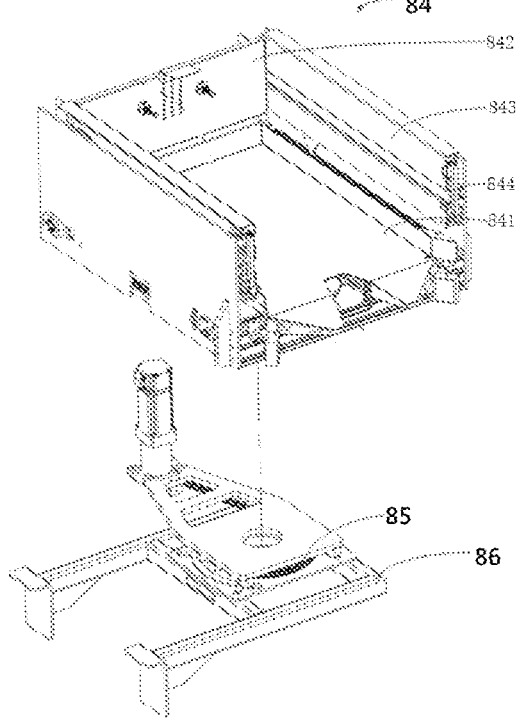
FIG. 1G is a schematic structural diagram of the carrying apparatus according to the embodiment shown in FIG. 1F.

Exemplarily, FIG. 1G is a schematic structural diagram of the carrying apparatus according to the embodiment shown in FIG. 1F.

Exemplarily, the carrying apparatus 84 is mounted to a bracket 86 via a rotary mechanism 85. The rotary mechanism 85 is configured to drive the carrying apparatus 84 to rotate about a vertical axis relative to the bracket 86, so as to be aligned with the storage unit, or be aligned with the rack and/or the goods. The carrying apparatus 84 is configured to transport goods between the storage unit and the rack. In the case that the carrying apparatus 84 is not aligned with the rack and/or the goods, the rotary mechanism 85 can drive the carrying apparatus 84 to rotate relative to the bracket 86, so as to ensure that the carrying apparatus 84 is aligned with the rack and/or the goods.

Figure 1H:
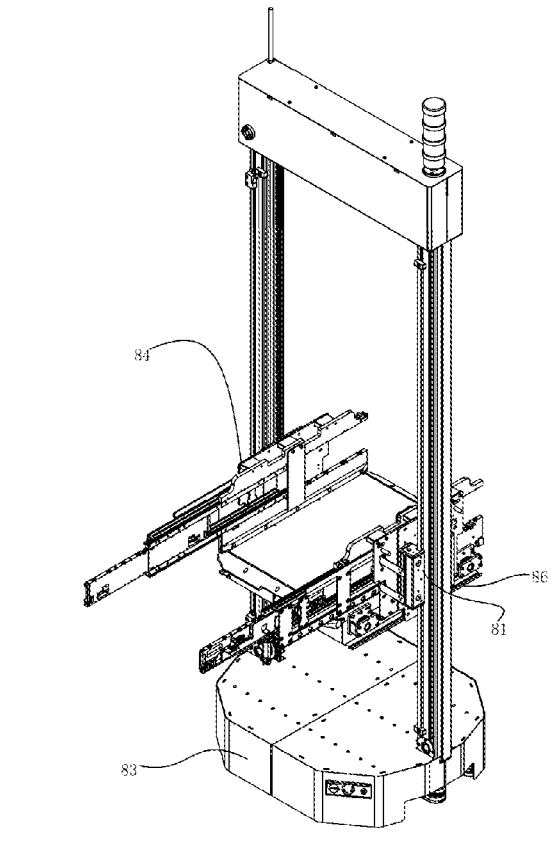
FIG. 1H is a schematic structural diagram of the robot and the carrying apparatus according to the embodiment shown in FIG. 1F.

FIG. 1H shows a structure of the robot and the carrying apparatus thereof according to the embodiment shown in FIG. 1F. With reference to FIG. 1F and FIG. 1G, the rotary mechanism 85 can be omitted according to an actual situation. For example, the transport robot 80 moves along a fixed track. After moving to the vicinity of the rack, the carrying apparatus 84 is always aligned with the rack and/or the goods, and the goods are placed in the goods pick-and-place direction of the carrying apparatus 84.

Figure 1I:
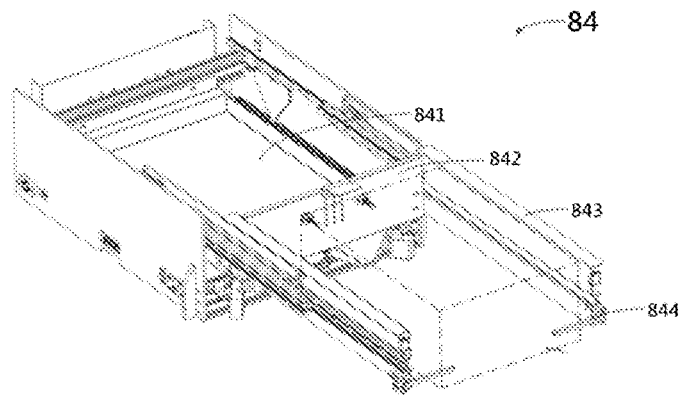
FIG. 1I is a schematic structural diagram of the carrying apparatus according to the embodiment shown in FIG. 1F.

Exemplarily, FIG. 1I is a schematic structural diagram of the carrying apparatus according to the embodiment shown in FIG. 1F, which can be understood with reference to FIG. 1G. As shown in FIG. 1I, the carrying apparatus 84 includes a tray 841 and a telescopic arm assembly. The tray 841 is configured to place goods, and may be a horizontal flat plate. The telescopic arm assembly is configured to push the goods placed on the tray 841 out of the tray 841 or pull goods to the tray 841. The telescopic arm assembly includes a telescopic arm 843, a fixed push rod 842, and a movable push rod 844. The telescopic arm 843 includes a left telescopic arm and a right telescopic arm. The telescopic arm 843 is extendable horizontally. The telescopic arm 843 is located on a side of the tray 841 in a direction perpendicular to the extending direction of the telescopic arm 843 and parallel to the tray 841. The telescopic arm 843 is powered by a motor. The power is transmitted by a sprocket wheel mechanism. According to an actual situation, the sprocket wheel mechanism may be replaced by a transmission mechanism such as a belt pulley mechanism or a screw mechanism for driving. The fixed push rod 842 and the movable push rod 844 are both mounted to the telescopic arm 843. The fixed push rod 842 and the movable push rod 844 can extend together with the telescopic arm 843. The fixed push rod 842 and the tray 841 are located on the same side of the telescopic arm 843. When the telescopic arm 843 extends, the fixed push rod 842 is configured to push the goods out of the tray 841. The movable push rod 844 is receivable in the telescopic arm 843. When the movable push rod 844 is not received in the telescopic arm 843, the movable push rod 844, the fixed push rod 842, and the tray 841 are all located on the same side of the telescopic arm 843. The movable push rod 844 is located in the extending direction of the fixed push rod 842 along the telescopic arm 843. The movable push rod 844 may be directly driven by a motor. According to an actual situation, the power is transmitted by a transmission mechanism such as a gear-set or a con-rod mechanism. When the movable push rod 844 is not received in the telescopic arm 843, and the telescopic arm 843 retracts, the movable push rod 844 is configured to pull the goods to the tray 841.

Exemplarily, the fixed push rod 842 of the carrying apparatus 84 may be designed to have a finger rod structure as the movable push rod 844.

Exemplarily, the carrying apparatus 84 may be designed to have a structure in which the spacing width of the telescopic arm assembly is adjustable. When placing/picking up goods, the spacing width of the telescopic arm assembly can be adjusted according to the size of the goods.

Figure 1J:
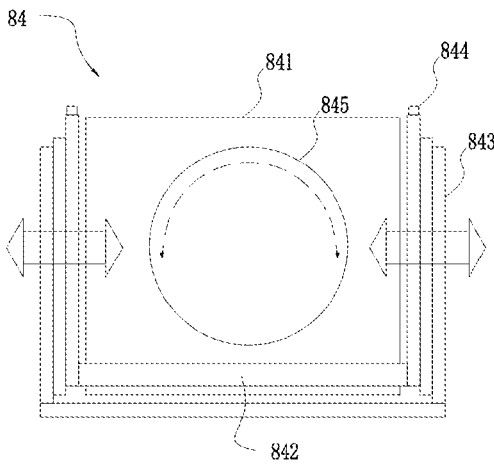
FIG. 1J is a schematic structural diagram of another carrying apparatus according to the embodiment shown in FIG. 1I.

Exemplarily, the carrying apparatus 84 may further include a steering structure, such as a turntable. The steering structure may be configured to change the orientation of the goods placed on the tray 841. FIG. 1J is a schematic structural diagram of another carrying apparatus according to the embodiment shown in FIG. 1I. With reference to FIG. 1J and FIG. 1I, the carrying apparatus 84 may further include one steering structure, namely the turntable 845 shown in FIG. 1I, to change the orientation of the goods placed on the tray 841.

Figure 1K:
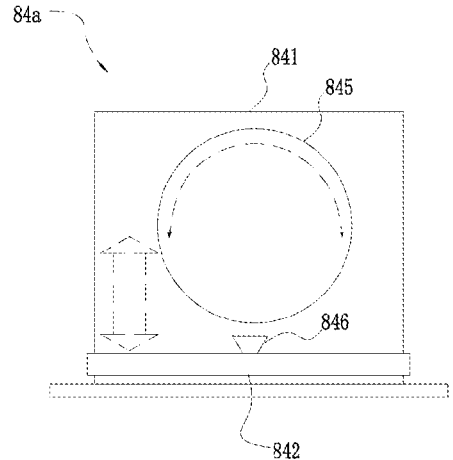
FIG. 1K is a schematic structural diagram of another carrying apparatus according to the embodiment shown in FIG. 1F.

Exemplarily, FIG. 1K is a schematic structural diagram of another carrying apparatus according to the embodiment shown in FIG. 1F. The carrying apparatus 84a includes one or more suction cups 846, which are mounted to the fixed push rod 842. The fixed push rod 842 may be rod-shaped or plate-shaped. When placing/picking up goods, the fixed push rod 842 can be driven to move towards the direction of the goods and/or the rack, to make back-and-forth displacement. The suction cups 846 adsorb the goods, with the cooperation of the displacement of the fixed push rod 842, the goods are carried to the rack or to the tray 841.

Figure 1L:
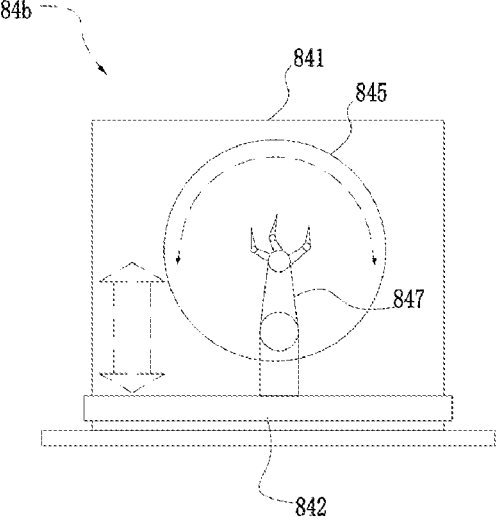
FIG. 1L is a schematic structural diagram of another carrying apparatus according to the embodiment shown in FIG. 1F.

Exemplarily, FIG. 1L shows a structure of another carrying apparatus according to the embodiment shown in FIG. 1F. The carrying apparatus 84b includes one or more robotic arms 847, which are mounted at appropriate positions on the fixed push rod 842 and/or the carrying apparatus 84b. When placing/picking up goods, the fixed push rod 842 can be driven to move towards the direction of the goods and/or the rack, to make back-and-forth displacement. The robotic arms 847 grasp/hook the goods, with the cooperate of the displacement of the fixed push rod 842, the goods are carried to the rack or to the tray 841.

Exemplarily, the carrying apparatus (84a, 84b) may further include a steering structure, such as the turntable 845 as shown in FIG. 1J and FIG. 1K, to change the orientation of the goods placed on the tray 841.

The structure of the carrying apparatus according to the embodiments of the present disclosure may include a combination of one or more of the foregoing examples.

The beneficial effect is that, compared to the telescopic arm, the structure of using the suction cups or the robotic arms can shorten the safe distance between goods, and further increases the density of the goods on the rack of the warehousing system. This improves the space utilization rate, thereby reducing the storage cost.

Figure 2:
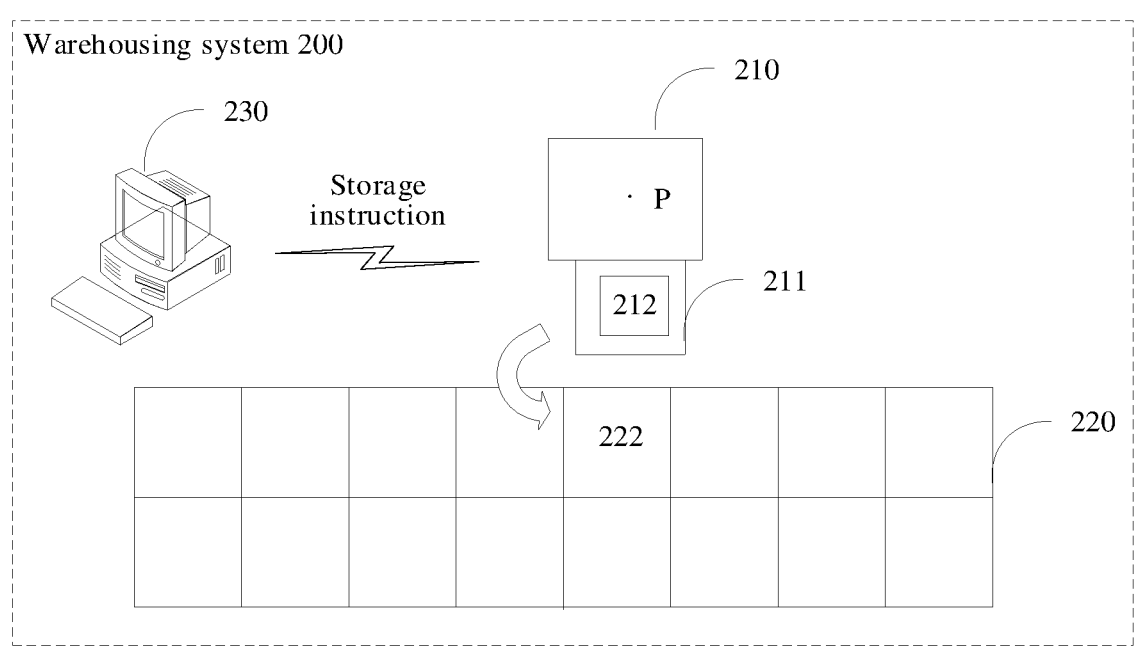
FIG. 2 is a diagram of an application scenario of a goods storage method according to an embodiment of the present disclosure.

FIG. 2 is an application scenario diagram of a goods storage method according to an embodiment of the present disclosure. As shown in FIG. 2, the goods storage method according to the embodiment of the present disclosure may be executed by a robot of a warehousing system. The warehousing system 200 uses the robot 210 to retrieve and/or store goods on the rack 220, and uses the warehousing management device 230 to perform path planning, status monitoring and scheduling for the robot 210, which allows the robot 210 to move to a set position, and perform the corresponding task of picking up and/or placing the goods. The warehousing management device 230 further stores storage information of each storage space on the rack 220 and basic information of each piece of goods, which facilitates the warehousing management. In order to place the goods to be stored 212 to a target storage location 222, generally, the goods to be stored 212 are first placed in the storage unit of the robot 210 or on the carrying apparatus 211. In response to receiving the storage instruction of the warehousing management device 230, the robot 210 moves to the corresponding position P according to the storage instruction, and places the goods to be stored 212 to the target position 222 corresponding to the storage instruction, thereby completing the placement or the storage of the goods to be stored 212.

In the related art, after moving to the position P, the robot 210 directly places the goods to be stored 212 to the target position 222, without preforming real-time detection on the target position 222. In the case that all or a part of the target position 222 is occupied by other goods or obstacles, or there is a deviation in the position of the robot 210, directly placing the goods to be stored 212 easily causes collision accidents, thereby resulting in damage to the goods, even tip-overs of the rack.

In order to improve the safety of goods storage, an embodiment of the present disclosure provides a goods storage method. After moving to the corresponding position according to the storage instruction, the robot detects the storage region of the rack. In the case that the detection result is that the storage region is occupied, the robot moves towards an unoccupied region by adjusting its position, which realizes real-time detection on the region of the rack. In addition, in the case that the detection result is that the region is occupied, the position of the robot is automatically adjusted, to successfully place the goods, thereby improving the safety and efficiency of goods storage.

Figure 3A:
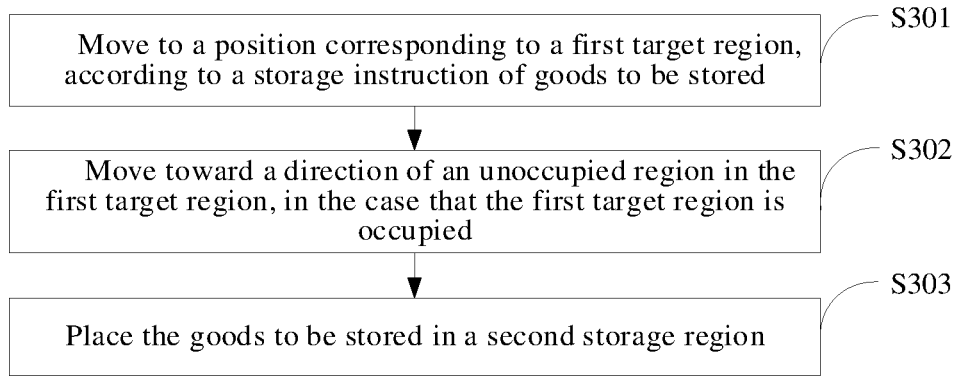
FIG. 3A is a flowchart of a goods storage method according to an embodiment of the present disclosure.

FIG. 3A is a flowchart of a goods storage method according to an embodiment of the present disclosure. As shown in FIG. 3A, the goods storage method may be executed by a robot of a warehousing system, which may be called a robot. The goods storage method according to this embodiment includes the following steps:

Step S301. Move to the position corresponding to a first target region, according to a storage instruction of goods to be stored.

The first target region is the storage region corresponding to the goods to be stored. The first target region is determined according to the size information of the goods to be stored and the dynamic goods storage space on the rack corresponding to the goods to be stored. The goods to be stored are any one or more items that need to be stored or placed, such as boxes, packages, and the like, whose quantity may be one or more. The storage instruction may be generated by the warehousing management device or other devices of the warehousing system. The rack of the warehousing system may plan the goods storage space using the goods storage method based on the dynamic configuration of the goods storage space, and determine the size of the corresponding storage region according to the actual size of the goods to be stored, so that the rack can include storage regions of different sizes, or storage regions of various sizes.

In the conventional warehousing system, each storage location or storage region of the rack is predetermined and has the same size, so that when the storage region of the goods is determined, the storage space corresponding to each storage location on the rack is regarded as a discrete and non-continuous space. In contrast, according to the goods storage method based on the dynamic configuration of the goods storage space, when determining the storage space or the storage location of the goods, each vacant storage space on the rack is regarded as a continuous space. Further, the position and the size of the storage space of the goods are determined according to the size information of the goods and the space size of each continuous storage space.

Specifically, the storage space on the rack where the goods to be stored are stored is a continuous space, which can be divided into storage locations of various sizes less than its physical size. The goods on the rack may be in the one-dimensional configuration mode and/or the two-dimensional configuration mode, that is, the goods may be placed in one or more rows on a certain shelf of the rack.

Figure 3B:
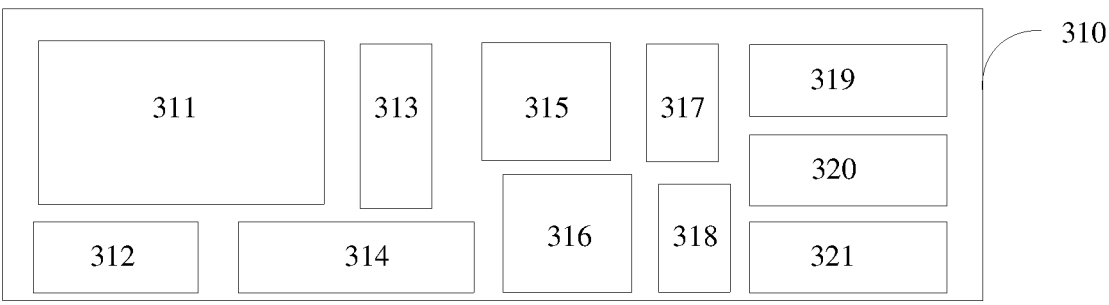
FIG. 3B is a schematic diagram of a storage condition of the rack according to the embodiment shown in FIG. 3A.

Exemplarily, FIG. 3B is a schematic diagram of the storage condition of the rack according to the embodiment shown in FIG. 3A. As shown in FIG. 3B, the goods 311 to 321 are placed on the rack 310. It can be seen that the storage spaces of the goods on the rack have dynamic sizes, which are determined based on the sizes of the stored goods. The storage spaces corresponding to the goods with different sizes are different in size.

Specifically, the region size of the first target region may be the sum of the size information of the goods to be stored and a preset safe spacing. The preset safe spacing may include a preset safe length spacing and a preset safe width spacing. The length of the first target region may be the sum of the length of the goods to be stored and the preset safe length spacing. The width of the first target region may be at least the sum of the width of the goods to be stored and the preset safety width spacing.

The preset safety spacing may be determined according to the type or the size of the carrying apparatus of the robot. For the carrying apparatus including the suction cup, the preset safety spacing can be very small, such as 3 cm, or be ignored. For the carrying apparatus including the left telescopic arm and the right telescopic arm, the preset safety spacing is at least the width of the telescopic arm. For the carrying apparatus including the robotic arm, the preset safety spacing is at least the width of the grasp or hook portion of the robotic arm.

Specifically, the warehousing management device may determine the first target region of the goods to be stored according to the storage condition of the warehousing system and the size information of the goods to be stored, and further generates the storage instruction according to the first target region. In addition, the warehousing management device may determine the robot that is used to place the goods to be stored, according to the operation condition of each robot of the warehousing system and the position information of the first target region, so as to allow the robot to perform the placement of the goods to be stored. Specifically, the robot places the goods to be stored in the storage unit of the robot or in the carrying apparatus, and according to the storage instruction, moves to the position corresponding to the first target region, which may be a set distance, such as 20 cm, directly in front of the first target region.

Optionally, after moving to the position corresponding to the first target region according to the storage instruction of the goods to be stored, the method further includes: detecting the first target region, to obtain a first detection result; and determining that the first target region is occupied according to the first detection result.

Specifically, the first target region may be detected based on a sensor mounted to the robot, to obtain the first detection result. Further, it is determined whether the first target region is occupied according to the first detection result.

The sensor includes at least one of an ultrasonic sensor, a laser sensor, a 2D camera, and a 3D camera. The sensor may be mounted to the robot body or on the carrying apparatus. The carrying apparatus is the device of the robot that is configured to place goods. The carrying apparatus may be a fork, a robotic arm, and the like. Specifically, the carrying apparatus is a fork with an adjustable width.

Specifically, after the robot moves to the position corresponding to the first target region, the sensor mounted to the robot and/or the carrying apparatus is turned on, to capture the first detection result of the first target region.

Specifically, there may be one, two or even more sensors, which is determined according to the field of view of the sensor. The sensors may be respectively mounted at the left end and the right end of the carrying apparatus, to respectively detect the storage conditions of the corresponding regions at the left and right ends of the carrying apparatus. The sensor may be mounted at any other position of the carrying apparatus, as long as the field of view of the sensor is not obstructed by the goods to be stored on the carrying apparatus.

In the case that the sensor is a 2D camera, the 2D camera may be a miniature camera, and mounted at either end of the left end and the right end of the carrying apparatus. For example, in the case that the carrying apparatus includes the left arm and the right arm, the 2D camera is mounted to the upper surface of the left arm or the right arm. After the robot moves to the position corresponding to the first target region, the 2D camera is turned on, and captures an image of the first target region. This image is the first detection result. In the case that the sensor is a 3D camera, the first detection result is point cloud data captured by the 3D camera. The specific capturing process is similar to that of the 2D camera, which is not detailed herein.

In the case that the sensor is a laser sensor, the laser sensor may be mounted at the ends of the left arm and the right arm of the carrying apparatus. The laser sensor may specifically be a laser radar. After the robot moves to the position corresponding to the first target region, the laser sensor is turned on. The laser sensor emits a laser signal and receives the returned laser signal. Further, the storage condition of the first target region is determined according to the returned laser signal (namely the first detection result).

Further, it is determined whether the first target region is occupied according to the storage condition of the first target region. Specifically, if the storage condition is that no goods are stored or the first target region is in a vacant state, the first target region is not occupied; and if the storage condition is that there is an obstacle, the first target region is occupied by the obstacle.

Further, when obtaining the first detection result, the robot generally does not move.

Further, after obtaining the first detection result, the method further includes: performing pre-processing on the first detection result. The pre-processing includes, but is not limited to, operations such as noise reduction, color space conversion, and image segmentation.

Specifically, after moving to the position corresponding to the first target region, the robot may further determine the position deviation according to the position of the reference point of the rack. Then, the position of the robot is adjusted according to the position deviation, thereby improving the accuracy of the position of the robot.

Optionally, after moving to the position corresponding to the first target region according to the storage instruction of the goods to be stored, the method includes: identifying the position information of the reference point corresponding to the first target region or a second target region; and adjusting the position of the robot according to the position information of the reference point. After the position adjustment is completed, the first target region is detected, to obtain the first detection result.

The reference point includes one or more of the column of the rack corresponding to the first target region or the second target region, adjacent goods that are in a preset range of the first target region or the second target region and whose position is known, and a marking point in the preset range of the first target region or the second target region. The marking point may be a position point pasted with a set marker, which may include a QR code, a circular code, a bar code and other identification codes, for assisting the robot in position adjustment.

Specifically, identifying the position information of the reference point corresponding to the first target region or the second target region includes: identifying the position information of the reference point corresponding to the first target region, in the case that the first target region is not occupied; and identifying the position information of the reference point corresponding to the second target region, in the case that the first target region is occupied.

Specifically, the position of the reference point of the first target region may be obtained according to a position sensor or a vision sensor of the robot.

The position sensor may be a laser sensor, an ultrasonic sensor, or an infrared sensor. The vision sensor may be a 2D camera or a 3D camera (depth camera).

Further, by identifying the position information of the reference point, the robot can approach the identified reference point, such as the next-door goods or the adjacent goods, or the column, which realizing that the goods on the rack are placed close, thereby ensuring that a large unoccupied space is reserved for subsequent goods storage. This improves the space utilization rate of the rack and the density of goods placement, thereby reducing the warehousing cost.

Step S302. Move toward the direction of the unoccupied region in the first target region, in the case that the first target region is occupied.

The first target region being occupied may be that the first target region is occupied by an obstacle. The obstacle may be other goods of the warehousing system, or any object that has not been recorded, such as a safety helmet.

Specifically, in the case that the first target region is occupied, the unoccupied region in the first target region is determined, and the robot moves toward the direction of the unoccupied region in the first target region.

Specifically, in the case that the first target region is occupied, the occupied region in the first target region is determined, and the robot moves toward the opposite direction of the occupied region of the first target region.

Optionally, moving toward the direction of the unoccupied region in the first target region in the case that the first target region is occupied includes: determining, in the case that the first target region is occupied, and the central axis of the carrying apparatus of the robot is obstructed by an obstacle, a first distance between a first edge of the obstacle and the central axis and a second distance between a second edge of the obstacle and the central axis, where the orientation of the carrying apparatus is the goods pick-and-place direction; and moving a target movement distance toward the direction where the first edge of the obstacle is located, the first distance being less than or equal to the second distance.

The first edge and the second edge of the obstacle are the edges of the obstacle in two opposite directions. The two opposite directions are perpendicular to the goods pick-and-place direction of the carrying apparatus.

Specifically, in the case that the central axis of the carrying apparatus is obstructed by the obstacle, it indicates that the position of the obstacle is in the middle of the first target region, and the distances, namely the first distance and the second distance, from the left edge and the right edge, namely the first edge and the second edge, to the central axis can be determined, to compare the first distance and the second distance. In the case that the first distance is less than or equal to the second distance, the robot moves the target movement distance toward the direction where the first edge of the obstacle is located; and in the case that the first distance is greater than the second distance, the robot moves the target movement distance toward the direction where the second edge of the obstacle is located.

Figure 3C:
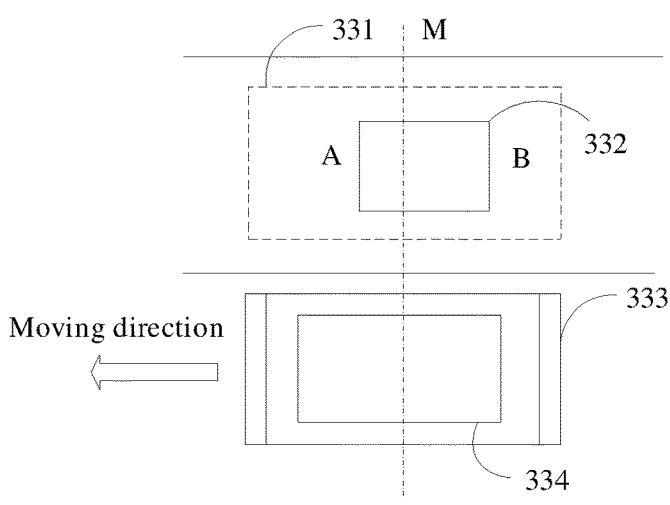
FIG. 3C is a schematic diagram of a storage condition of the first target region according to the embodiment shown in FIG. 3A.

Exemplarily, FIG. 3C is a schematic diagram of the storage condition of the first target region according to the embodiment shown in FIG. 3A. As shown in FIG. 3C, the first target region 331 is occupied by the obstacle 332, and the goods to be stored 334 are placed in the carrying apparatus 333 of the robot. The central axis M of the carrying apparatus 333 is obstructed by the obstacle 332. Since the first distance between the first edge A of the obstacle 332 and the central axis M is less than the second distance between the second edge B of the obstacle 332 and the central axis M, the moving direction of the robot is the direction where the first edge A is located, specifically the direction indicated by the arrow in FIG. 3C.

Optionally, moving toward the direction of the unoccupied region in the first target region in the case that the first target region is occupied includes: moving, in the case that the first target region is occupied, and a first end of a carrying apparatus of the robot is obstructed when a second end of the carrying apparatus is not obstructed, a target movement distance toward a direction where the second end is located, where an orientation of the carrying apparatus is a goods pick-and-place direction; and in the case that the first target region is occupied, the second end of the robot is obstructed when the first end is not obstructed, moving toward the direction where the first end is located.

Specifically, in the case that only one end of the carrying apparatus of the robot is obstructed, the robot moves toward the unobstructed end.

Figure 3D:
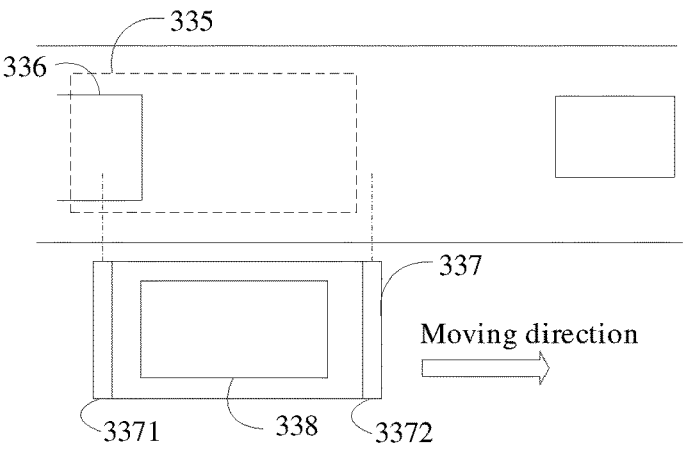
FIG. 3D is a schematic diagram of a storage condition of the first target region according to the embodiment shown in FIG. 3A.

Exemplarily, FIG. 3D is a schematic diagram of the storage condition of the first target region according to the embodiment shown in FIG. 3A. As shown in FIG. 3D, the first target region 335 is occupied by the obstacle 336, and the first end 3371 of the carrying apparatus 337 of the robot is obstructed by the obstacle 336 when the second end 3372 is not obstructed, the moving direction of the robot is the direction where the second end 3372 is located, specifically the direction indicated by the arrow in FIG. 3D.

Step S303. Place the goods to be stored in the second target region.

The second target region is the corresponding storage region after the robot moves. The second target region and the first target region may partially overlap or may not overlap.

Specifically, after the movement of the robot is completed, the goods to be stored are placed in the second target region of the rack from the storage unit or the carrying apparatus of the robot.

Figure 3E:
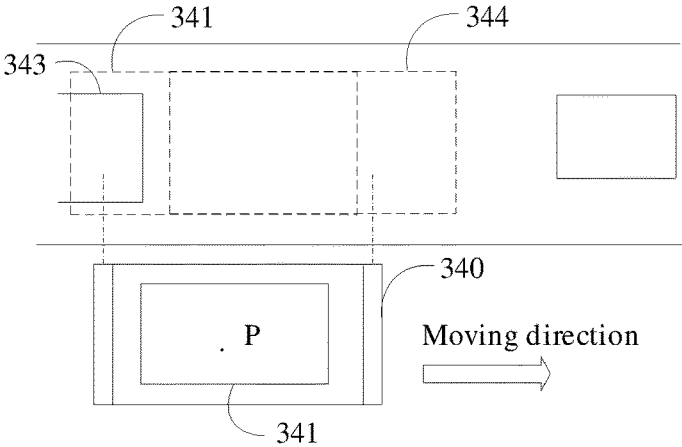
FIG. 3E is a schematic diagram of the first target region and the second target region according to the embodiment shown in FIG. 3A.

Exemplarily, FIG. 3E is a schematic diagram of the first target region and the second target region according to the embodiment shown in FIG. 3A. As shown in FIG. 3E, the goods to be stored 341 are placed on the carrying apparatus 340 of the robot. After the robot moves to the position point P corresponding to the first target region 342, it is found that the first target region 342 is occupied by the next-door goods 343, namely the obstacle as described above. That is, the first target region 342 is occupied by the next-door goods 343. Then, the robot moves toward the direction of the unoccupied region, namely the direction indicated by the arrow in FIG. 3E, and moves to the corresponding position of the second target region 344. After the movement of the robot is completed, the robot can place the goods to be stored 341 in the second target region 344.

Further, after the movement of the robot is completed, it may be determined whether the second target region is occupied. In the case that the second target region is not occupied, the goods to be stored are placed in the second target region.

Optionally, placing the goods to be stored in the second target region includes: obtaining a storage condition of the goods to be stored; and placing the goods to be stored in the second target region, in the case that the second target region meets the storage condition of the goods to be stored.

The storage condition for storing the goods may be a size condition, including the minimum size that the goods to be stored can be safely stored. In the case that the size of the continuous vacant space of the second target region is greater than the minimum size, the second target region meets the storage condition of the goods to be stored.

Further, in the case that the second target region fails to meet the storage condition, the second target region may be regarded as the first target region. Then, the position of the robot is adjusted, to obtain a third storage region. In the case that the third storage region meets the storage condition of the goods to be stored, the goods to be stored are stored in the third storage region, and so on.

Optionally, the method further includes: generating storage abnormal information, in the case that the second target region fails to meet the storage condition of the goods to be stored.

The storage abnormal information may include identification information of the first target region and abnormal content, and may further include position information of the obstacle and an actual vacant space of the first target region. The abnormal content may be "The first target region is occupied by an obstacle, resulting in insufficient space in the first target region to store the goods to be stored, please re-allocate a storage region for the goods to be stored" or "There is insufficient space in the first target region, please check".

Further, in the case that the second target region fails to meet the storage condition of the goods to be stored, the number of times that the goods to be stored fail to be stored is increased by 1. The initial value of the number of times that the goods to be stored failed to be stored is 0. The robot may display the storage abnormal information by a display apparatus, to remind relevant personnel to detect the first target region and the second target region, or to re-allocate the storage region of the goods to be stored. In addition, the robot may transmit the generated abnormal storage information to the warehousing management device of the warehousing system. The warehousing management device re-allocates the storage region for the goods to be stored, and generates a new storage instruction, and then transmits the new storage instruction to the corresponding robot, to allow the robot to place the goods to be stored. This process is repeatedly performed, until the goods to be stored are successfully stored on the rack, or the number of times that the goods to be stored are failed to be stored reaches a set number, such as 3 or 5.

Further, after generating the storage abnormal information, the warehousing system may set the first target region and the second target region to a locked state or a disabled state, thereby preventing other goods to be stored from being allocated to these regions.

In this embodiment, for the warehousing system based on the dynamic configuration of the goods storage space, the robot moves to the position corresponding to the first target region according to the storage instruction, and detects the first target region in real time before storing the goods. In the case that the first target region is determined to be occupied, the robot moves toward the direction of the unoccupied region, to obtain the corresponding second target region after the movement, and then places the goods in the second target region, which realizes real-time detection of the goods storage region, thereby improving the safety of goods storage. In addition, in the case that the region is occupied, the robot automatically moves, to obtain a new unoccupied region for storing the goods. As such, under the abnormal situation where the region is occupied, the corresponding processing policy is automatically determined, to successfully store the goods, which improves the efficiency of goods storage and the intelligence of the robot.

Figure 4:
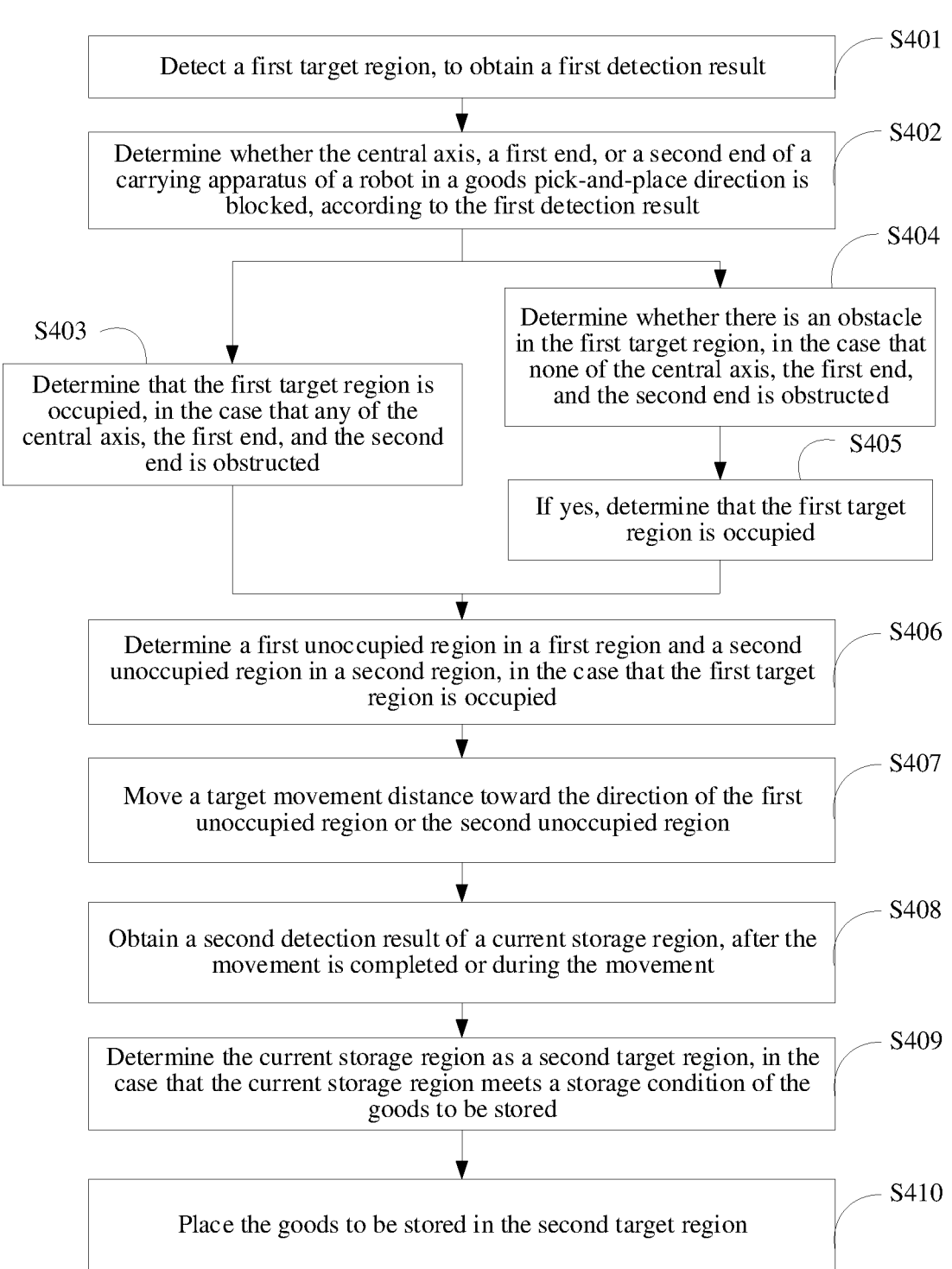
FIG. 4 is a flowchart of a goods storage method according to another embodiment of the present disclosure.

FIG. 4 is a flowchart of a goods storage method provided by another embodiment of the present disclosure. The goods storage method provided by this embodiment further refines step S303 and step S304 based on the embodiment shown in FIG. 3A, and adds the step of determining that the first target region is occupied before step S301. As shown in FIG. 4, the goods storage method provided by this embodiment includes the following steps:

Step S401. Detect a first target region, to obtain a first detection result.

Step S402. Determine whether the central axis, a first end, or a second end of the carrying apparatus of the robot in the goods pick-and-place direction is obstructed, according to the first detection result.

The first end and the second end of the carrying apparatus are two opposite ends. The first end of the carrying apparatus may be the end located on the left side of the central axis, and the second end may be the end located on the right side of the central axis.

Exemplarily, the carrying apparatus includes two robotic arms. In this case, the first end may be the robotic left arm, and the second end may be the robotic right arm.

Specifically, whether the central axis, the first end or the second end is obstructed may be determined according to a sensor mounted at a corresponding position of the carrying apparatus. The sensor may be one or more of an infrared sensor, an ultrasonic sensor, a laser sensor, a 2D camera, and a 3D camera.

Step S403. Determine that the first target region is occupied, in the case that any one of the central axis, the first end and the second end is obstructed.

Step S404. Determine whether there is an obstacle in the first target region, in the case that none of the central axis, the first end and the second end is obstructed.

Specifically, whether there is an obstacle in the first target region is determined according to the first detection result. For example, by using the image recognition algorithm, whether there is an obstacle in the first target region is determined according to the first detection result.

Further, according to the first detection result, it may be determined whether there is an obstacle in a first region and a second region of the first target region. The first region is the region in the first target region located on the left side of the central axis, and the second region is the region in the first target region located on the right side of the central axis.

Step S405. If yes, determine that the first target region is occupied.

Step S406. Determine a first unoccupied region in the first region and a second unoccupied region in the second region, in the case that the first target region is occupied.

The first region is the region in the first target region located on the left side of the central axis of the carrying apparatus, and the second region is the region in the first target region located on the right side of the central axis of the carrying apparatus. The orientation of the carrying apparatus is the goods pick-and-place direction.

Specifically, the first target region is segmented by the central axis to obtain the first region and the second region are two regions.

Specifically, the first unoccupied region in the first region and the second unoccupied region in the second region may be determined according to the first detection result.

Step S407. Move a target movement distance toward the direction of the first unoccupied region or the second unoccupied region.

The target movement distance is determined according to the edge position of the obstacle on the robot moving direction side, and the obstacle is the object occupying the first target region. The edge position on the robot moving direction side refers to the position of the edge of the obstacle close to the robot moving direction.

Specifically, the position of each edge of the obstacle may be identified according to the first detection result, Specifically, the robot may move toward the direction of the first unoccupied region in the first region, or move toward the direction of the second unoccupied region in the second region. The target movement distance needs to be determined according to the distance from the destination of the movement, namely the first unoccupied region or the second unoccupied region, to the current position of the robot.

Optionally, moving the target movement distance toward the direction of the first unoccupied region or the second unoccupied region includes: moving the target movement distance toward the direction of the first unoccupied region, the area of the first unoccupied region being greater than or equal to the area of the second unoccupied region; or moving the target movement distance toward the direction of the second unoccupied region, the area of the second unoccupied region being greater than or equal to the area of the first unoccupied region.

Specifically, in order to improve the storage efficiency of the goods to be stored, the robot may move toward the direction of the larger unoccupied region, thereby enhancing the possibility that the goods to be stored are stored in the unoccupied region.

Figure 5:
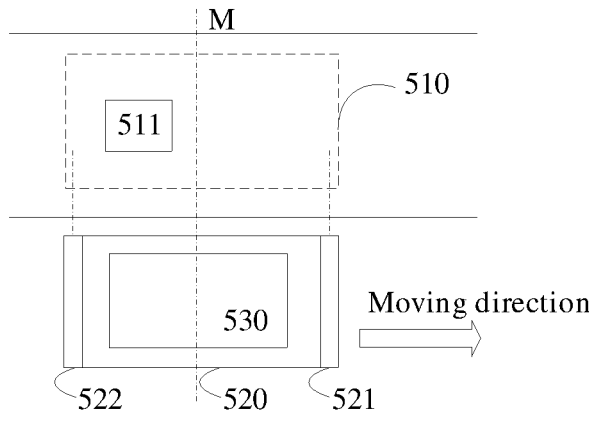
FIG. 5 is a schematic structural diagram of the storage condition of a first target region according to the embodiment shown in FIG. 4.

Exemplarily, FIG. 5 is a schematic diagram of the storage condition of the first target region according to the embodiment shown in FIG. 4 of the present disclosure. As shown in FIG. 5, the first target region 510 is occupied by the obstacle 511, and the central axis M, the first end 521 and the second end 522 of the carrying apparatus 520 of the robot are not obstructed, then it is determined that there is an obstacle in the first target region. In addition, since the area of the second unoccupied region in the second region is greater than the area of the first unoccupied region, the robot needs to move to the right. The moving direction is the direction indicated by the arrow as in FIG. 5.

Step S408. Obtain a second detection result of the current storage region, after the movement is completed or during the movement.

The current storage region is the corresponding storage region after the movement is completed or during the movement.

Specifically, the specific process of obtaining the second detection result is similar to the process of the first detection result, which is not detailed herein.

Specifically, the unoccupied space of the current storage region can be identified according to the second detection result, so that in the case that the size of the unoccupied space meets the size condition of the goods to be stored, the goods to be stored are placed in the unoccupied space.

Further, whether the current storage region is occupied may be determined according to the amplitude of the returned laser signal acquired by the laser radar mounted to the unobstructed end, such as the second end, of the carrying apparatus.

Further, the size information of the current storage region corresponding to the current field of view of the 2D camera may be determined based on the image acquired after the movement of the 2D camera mounted to the carrying apparatus is completed.

Further, the size information of the current storage region corresponding to the current field of view of the 3D camera may be determined based on the point cloud data acquired after the movement of the 3D camera mounted to the carrying apparatus is completed.

Step S409. Determine the current storage region as the second target region, in the case that the current storage region meets the storage condition of the goods to be stored.

Specifically, in the case that the size of the continuous unoccupied space of the current storage region reaches a preset size or meets the size condition of the goods to be stored, the current storage region is determined as the second target region.

Step S410. Place the goods to be stored in the second target region.

The second target region is the corresponding storage region after the robot moves.

Optionally, after placing the goods to be stored in the second target region, the method further includes: obtaining storage information of the goods to be stored, and transmitting the storage information. The storage information includes the position information of the second target region.

Specifically, after the goods to be stored are placed in the second target region, the storage information of the goods to be stored may be acquired by the robot and/or the sensor mounted to the carrying apparatus. The storage information includes, but is not limited to: the placement position of the goods to be stored, the placement angle, the spacing with adjacent objects, and the like, so that the position of the goods to be stored can be adjusted according to the storage information, to ensure the accuracy of the placement of the goods to be stored, thereby improving the safety of the placement of the goods to be stored and facilitating the subsequent placement of the goods to be stored.

Further, after the goods to be stored are placed in the second target region, or after the position of the goods to be stored has been adjusted, the method further includes:

reporting the storage information of the goods to be stored, for example, transmitting the storage information to the warehousing management device of the warehousing system.

In this embodiment, before the goods are placed, through real-time detection of the storage region, whether the storage region is occupied is determined based on the obstructed situation of the central axis, the first end or the second end of the robot, which improves the real-time property of the detection and the safety of goods storage. In the case that the storage region is occupied, the movement policy of the robot is determined according to the relative relationship between the obstacle and the central axis, the first end and the second end of the carrying apparatus, to determine the new storage region by the movement of the robot. Whether the new storage region meets the storage condition is determined, and if so, the goods are placed in the new storage region, which realizes the placement of the goods under abnormal situations, thereby improving the efficiency of the goods warehousing.

Figure 6:
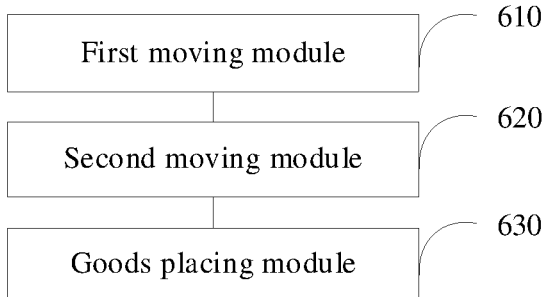
FIG. 6 is a schematic structural diagram of a goods storage apparatus according to an embodiment of the present disclosure.

FIG. 6 is a schematic structural diagram of a goods storage apparatus according to an embodiment of the present disclosure. As shown in FIG. 6, the goods storage apparatus includes: a first moving module 610, a second moving module 620, and a goods placement module 630.

The first moving module 610 is configured to move to a position corresponding to a first target region according to a storage instruction of goods to be stored. The first target region is a storage region corresponding to the goods to be stored, and the first target region is determined according to size information of the goods to be stored and a dynamic goods storage space on a rack corresponding to the goods to be stored; The second moving module 620 is configured to move toward a direction of an unoccupied region in the first target region, in a case that the first target region is occupied. The goods placement module 630 is configured to place the goods to be stored in a second target region. The second target region is a corresponding storage region after the robot moves.

Optionally, the apparatus further includes: a first detection module, configured to detect the first target region, to obtain a first detection result; and a first result determining module, configured to determine that the first target region is occupied according to the first detection result.

Optionally, the first result determining module is further configured to: determine whether a central axis, a first end or a second end of a carrying apparatus of the robot in a goods pick-and-place direction is obstructed, according to the first detection result; and determine that the first target region is occupied, in a case that any one of the central axis, the first end and the second end is obstructed.

Optionally, the first result determining module is further configured to: determine whether there is an obstacle in the first target region, in a case that none of the central axis, the first end and the second end is obstructed; and if yes, determine that the first target region is occupied.

Optionally, the second moving module 620 is further configured to: determine a first unoccupied region in the first region and a second unoccupied region in the second region, in the case that the first target region is occupied, where the first region is a region in the first target region located on a left side of the central axis of the carrying apparatus, the second region is a region in the first target region located on a right side of the central axis of the carrying apparatus, and an orientation of the carrying apparatus is the goods pick-and-place direction; and move a target movement distance toward a direction of the first unoccupied region or the second unoccupied region.

Optionally, the second moving module 620 is further configured to: move the target movement distance toward the direction of the first unoccupied region, where the area of the first unoccupied region is greater than or equal to the area of the second unoccupied region; or move the target movement distance toward the direction of the second unoccupied region, where the area of the second unoccupied region is greater than or equal to the area of the first unoccupied region.

Optionally, the second moving module 620 is further configured to: determine, in the case that the first target region is occupied, and the central axis of the carrying apparatus of the robot is obstructed by an obstacle, a first distance between a first edge of the obstacle and the central axis and a second distance between a second edge of the obstacle and the central axis, where the orientation of the carrying apparatus is the goods pick-and-place direction; and move a target movement distance toward the direction where the first edge of the obstacle is located, the first distance being less than or equal to the second distance.

Optionally, the second moving module 620 is further configured to: move, in the case that the first target region is occupied, and a first end of a carrying apparatus of the robot is obstructed when a second end of the carrying apparatus is not obstructed, a target movement distance toward a direction where the second end is located, where an orientation of the carrying apparatus is a goods pick-and-place direction.

Optionally, the goods placement module 630 is further configured to: obtain a storage condition of the goods to be stored; and place the goods to be stored in the second target region, in the case that the second target region meets the storage condition of the goods to be stored.

Optionally, the apparatus further includes: generating storage abnormal information, in the case that the second target region fails to meet the storage condition of the goods to be stored.

Optionally, the apparatus further includes: a second detection module, configured to, before the goods to be stored in the second target region, obtain a second detection result of a current storage region after the movement is completed or during the movement, where the current storage region is a corresponding storage region after the movement is completed or during the movement; and a second target region determining module, configured to determine that the current storage region is the second target region, in a case that the current storage region meets the storage condition of the goods to be stored.

Optionally, the apparatus further includes: a storage information obtaining module, configured to obtain storage information of the goods to be stored, and transmit the storage information, where the storage information includes the position information of the second target region.

Optionally, the apparatus further includes: a position adjustment module, configured to identify the position information of the reference point corresponding to the first target region or the second target region according to the storage instruction, after the robot moves to the position corresponding to the first target region; and adjust the position of the robot according to the position information of the reference point.

The goods storage apparatus provided by the embodiments of the present disclosure can perform the goods storage method provided by any embodiment of the present disclosure, and has the corresponding functional modules and beneficial effects for performing the method.

Figure 7:
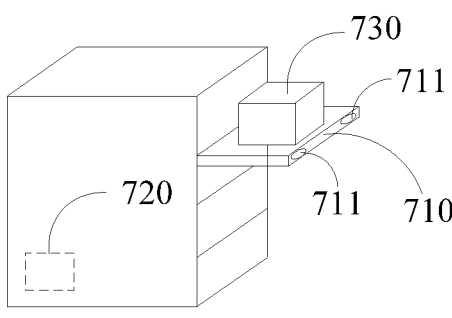
FIG. 7 is a schematic structural diagram of a robot according to an embodiment of the present disclosure.

FIG. 7 is a schematic structural diagram of a robot according to an embodiment of the present disclosure. As shown in FIG. 7, the robot includes: a carrying apparatus 710 and a processor 720.

The carrying apparatus 710 includes the left end and the right end, which is configured to place the goods 730 on the rack. The processor 720 is configured to perform the corresponding computer program, to realize the goods storage method according to any embodiment of the present disclosure shown in FIG. 2 to FIG. 5.

Relevant descriptions can be understood by correspondingly referring to the relevant descriptions and effects corresponding to the steps in FIG. 2 to FIG. 5, which is not detailed herein.

Specifically, the carrying apparatus 710 may be a fork or a robotic arm.

Further, the sensor 711 is mounted to the carrying apparatus 710 of the robot. The sensor 711 may be mounted at the left end or the right end of the carrying apparatus 710, or mounted at the left end or the right end of the carrying apparatus 710 respectively.

Specifically, the sensor 711 may be one or more of an ultrasonic sensor, an infrared sensor, a laser sensor, a 2D camera, or a 3D camera.

Optionally, the robot includes a mobile chassis, a carrying apparatus, a storage rack, and a lifting/lowering assembly. The storage rack, the carrying apparatus, and the lifting/lowering assembly are mounted to the mobile chassis.

Optionally, the carrying apparatus includes one or more of the following: a telescopic arm assembly, a suction cup, and a robotic arm.

Optionally, the carrying apparatus includes a tray and a steering structure. The steering structure is configured to change the orientation of the goods placed on the tray.

Figure 8:
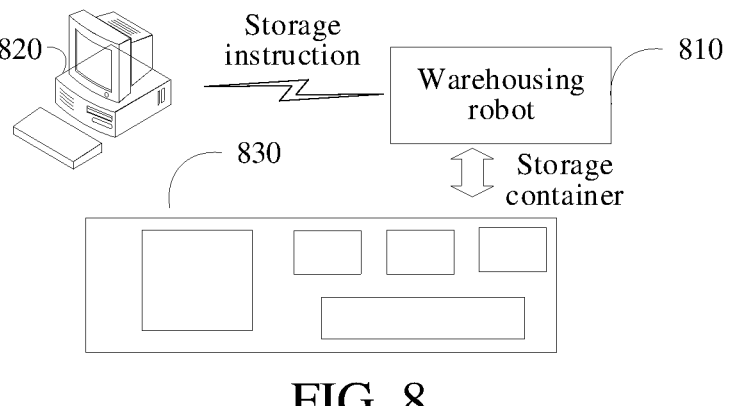
FIG. 8 is a schematic structural diagram of a warehousing system according to an embodiment of the present disclosure.

FIG. 8 is a schematic structural diagram of a warehousing system according to an embodiment of the present disclosure. As shown in FIG. 8, the warehousing system includes: the robot 810, the warehousing management device 820, and the rack 830.

The warehousing management device 820 is configured to generate the storage instruction. The robot 810 is the robot according to the embodiment shown in FIG. 7, which is configured to place goods according to storage instruction, so as to store the goods in a set position on the rack 830.

An embodiment of the present disclosure provides a computer-readable storage medium, having a computer program stored thereon. The computer program is executed by a processor, to implement the goods storage method according to any one of the embodiments corresponding to FIG. 2 to FIG. 5.

The computer-readable storage medium may be a read-only memory (ROM), a random access memory (RAM), a compact disc ROM (CD-ROM), a magnetic tape, a floppy disk, an optical data storage device, or the like.

The present disclosure further provides a program product, including an executable computer program. The executable computer program is stored in a readable storage medium. At least one processor of the robot or the warehousing system may read the computer program from the computer-readable storage medium, and the at least one processor executes the computer program, to cause the apparatus to implement the goods storage method according to any embodiment.

It is to be understood that the disclosed apparatus and method in the embodiments provided in the present disclosure may be implemented through other modes. For example, the foregoing apparatus embodiments are merely exemplary. For example, the module division is merely logical function division and may be other division in actual implementation. For example, a plurality of modules may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be electrical, mechanical, or in other forms.

The units described as separate components may or may not be physically separated, and the components displayed as units may or may not be physical units, and may be located in one place or may be distributed over a plurality of network units. Some or all of the modules may be selected according to actual needs to achieve the objectives of the solutions of the embodiments.

In addition, the functional modules in the embodiments of the present disclosure may be integrated into one processing unit, or each of the modules may be physically separated, or two or more modules may be integrated into one unit. The integrated unit may be implemented in the form of hardware, or may be implemented in a form of hardware with combination of software functional units.

The integrated module that is implemented in the form of software functional modules may be stored in a computer-readable storage medium. The software functional modules are stored in a storage medium, and include instructions to cause a computer device (such as a personal computer, a server, or a network device) or a processor to perform some of the steps in the method according to any of the embodiments of the present disclosure.

The processor may be a central processing unit (CPU), or another general-purpose processor, a digital signal processor (DSP), an application specific integrated circuit (ASIC), or the like. The general-purpose processor may be a microprocessor, or the processor may be any conventional processor or the like. The steps of the methods disclosed with reference to the embodiments of the present disclosure may be directly performed by using a hardware processor, or may be performed by using a combination of hardware and software modules in the processor.

The memory may include high-speed RAM memory, or may include an emerging non-volatile memory (NVMS), such as at least one disk memory, which may be a universal serial bus (USB) flash drive, a portable hard drive, a read-only memory (ROM), a disk, or a compact disc.

The bus may be an industry standard architecture (ISA) bus, a peripheral component (PCI) bus, or an extended industry standard architecture (EISA) bus, and the like. The bus may be an address bus, a data bus, a control bus, or the like. For the purposes of representation, the buses in the drawings of the present disclosure are not limited to a single bus or a single type of bus.

The foregoing storage medium may be implemented by any type of volatile or non-volatile storage device or a combination thereof, such as a static random access memory (SRAM), an electrically erasable programmable read-only memory (EEPROM), an erasable programmable read-only memory (EPROM), a programmable ROM (PROM), a ROM, a magnetic memory, a flash memory, a disk or an optical disc. The storage medium may be any available medium accessible to a general-purpose or dedicated computer.

For example, a storage medium is coupled to a processor, so that the processor can read information from the storage medium or write information into the storage medium. Certainly, the storage medium may be a component of the processor. The processor and the storage media may be located in the ASIC. Certainly, the processor and the storage medium may be used as discrete assemblies existing in an electronic device or a main control device.

A person of ordinary skill in the art may understand that: all or some of the steps in the method according to any of the foregoing embodiments may be implemented by a program instructing relevant hardware. The program may be stored in a computer-readable storage medium. When the program is executed, steps of the foregoing method embodiments are performed. The foregoing storage medium includes: a medium such as a ROM, a RAM, a magnetic disk, or an optical disc that can store the program code.

Finally, it should be noted that: the foregoing embodiments are merely used for describing the technical solutions of the present disclosure, but are not intended to limit the present disclosure. Although the present disclosure is described in detail with reference to the foregoing embodiments, it should be appreciated by a person skilled in the art that, modifications may still be made to the technical solutions described in the foregoing embodiments, or equivalent replacements may be made to the part of the technical features; and these modifications or replacements will not cause the essence of corresponding technical solutions to depart from the scope of the technical solutions in the embodiments of the present disclosure.

What is claimed is:

1. A goods storage method executed by a robot, the method comprising:
moving the robot to a position corresponding to a first target region according to a storage instruction of goods to be stored, wherein the first target region is a storage region corresponding to the goods to be stored, and the first target region is determined according to size information of the goods to be stored and a dynamic goods storage space on a rack corresponding to the goods to be stored;
moving the robot toward a direction of an unoccupied region in the first target region, in a case that the first target region is occupied; and
placing the goods to be stored in a second target region, wherein the second target region is a corresponding storage region after the robot moves, wherein placing the goods to be stored in the second target region comprises:
obtaining a storage condition of the goods to be stored; and
placing the goods to be stored in the second target region, in a case that the second target region meets the storage condition of the goods to be stored.

2. The goods storage method according to claim 1, further comprising:
detecting the first target region, to obtain a first detection result; and
determining that the first target region is occupied, according to the first detection result.

3. The goods storage method according to claim 2, wherein the determining that the first target region is occupied, according to the first detection result comprises:
determining whether a central axis, a first end or a second end of a carrying apparatus of the robot in a goods pick-and-place direction is obstructed, according to the first detection result; and determining that the first target region is occupied, in a case that any one of the central axis, the first end and the second end is obstructed.

4. The goods storage method according to claim 3, further comprising:
determining whether there is an obstacle in the first target region, in a case that none of the central axis, the first end and the second end is obstructed; and
determining that the first target region is occupied, in a case that there is an obstacle in the first target region.

5. The goods storage method according to claim 1, wherein moving the robot toward the direction of the unoccupied region in the first target region, in the case that the first target region is occupied comprises:
determining a first unoccupied region in a first region and a second unoccupied region in a second region, in the case that the first target region is occupied, wherein the first region is a region in the first target region located on a left side of a central axis of a carrying apparatus, the second region is a region in the first target region located on a right side of the central axis of the carrying apparatus, and an orientation of the carrying apparatus is a goods pick-and-place direction; and moving the robot a target movement distance toward a direction of the first unoccupied region or the second unoccupied region;
determining, in the case that the first target region is occupied and the central axis of the carrying apparatus of the robot is obstructed by an obstacle, a first distance between a first edge of the obstacle and the central axis and a second distance between a second edge of the obstacle and the central axis, wherein the orientation of the carrying apparatus is the goods pick-and-place direction; and moving the robot the target movement distance toward a direction where the first edge of the obstacle is located, the first distance being less than or equal to the second distance; or
moving the robot, in the case that the first target region is occupied and a first end of the carrying apparatus of the robot is obstructed when a second end of the carrying apparatus is not obstructed, the target movement distance toward a direction where the second end is located, wherein the orientation of the carrying apparatus is the goods pick-and-place direction.

6. The goods storage method according to claim 5, wherein moving the robot the target movement distance toward the direction of the first unoccupied region or the second unoccupied region comprises:
moving the robot the target movement distance toward the direction of the first unoccupied region, an area of the first unoccupied region being greater than or equal to an area of the second unoccupied region; or
moving the robot the target movement distance toward the direction of the second unoccupied region, the area of the second unoccupied region being greater than or equal to the area of the first unoccupied region.

7. The goods storage method according to claim 5, wherein the target movement distance is determined according to an edge position of the obstacle on a robot moving direction side, wherein the obstacle is an object occupying the first target region.

8. The goods storage method according to claim 1, further comprising:
generating storage abnormal information, in a case that the second target region fails to meet the storage condition of the goods to be stored.

9. The goods storage method according to claim 1, wherein before placing the goods to be stored in the second target region, the method further comprises:

obtaining a second detection result of a current storage region after the movement is completed and during the movement, wherein the current storage region is a corresponding storage region after the movement of the robot is completed or during the movement of the robot; and determining the current storage region as the second target region, in a case that the current storage region meets the storage condition of the goods to be stored.

10. A robot, comprising:

a carrying apparatus;

a mobile chassis;

at least one sensor; and at least one processor, wherein the at least one processor is configured to perform computer executable instructions, wherein the computer executable instructions comprise:

controlling the mobile chassis to move to a position corresponding to a first target region according to a storage instruction of goods to be stored, wherein the first target region is a storage region corresponding to the goods to be stored, and the first target region is determined according to size information of the goods to be stored and a dynamic goods storage space on a rack corresponding to the goods to be stored;

controlling the at least one sensor to detect the first target region, to obtain a first detection result;

determining that the first target region is occupied, according to the first detection result;

moving toward a direction of an unoccupied region in the first target region, in a case that the first target region is occupied; and controlling the carrying apparatus to place the goods to be stored in a second target region, wherein the second target region is a corresponding storage region after the mobile chassis has moved.

11. The robot according to claim 10, wherein the computer executable instructions comprise:

determining whether a central axis, a first end or a second end of the carrying apparatus of the robot in a goods pick-and-place direction is obstructed, according to the first detection result; and determining that the first target region is occupied, in a case that any one of the central axis, the first end and the second end is obstructed.

12. The robot according to claim 11, wherein the computer executable instructions further comprise:

determining whether there is an obstacle in the first target region, in a case that none of the central axis, the first end and the second end is obstructed; and determining that the first target region is occupied, in a case that there is an obstacle in the first target region.

13. The robot according to claim 11, wherein the computer executable instructions comprise:

determining a first unoccupied region in a first region and a second unoccupied region in a second region, in the case that the first target region is occupied, wherein the first region is a region in the first target region located on a left side of a central axis of the carrying apparatus, the second region is a region in the first target region located on a right side of the central axis of the carrying apparatus, and an orientation of the carrying apparatus is a goods pick-and-place direction; and moving the robot a target movement distance toward a direction of the first unoccupied region or the second unoccupied region;

determining, in the case that the first target region is occupied, and the central axis of the carrying apparatus of the robot is obstructed by an obstacle, a first distance between a first edge of the obstacle and the central axis and a second distance between a second edge of the obstacle and the central axis, wherein the orientation of the carrying apparatus is the goods pick-and-place direction; and moving the robot the target movement distance toward a direction where the first edge of the obstacle is located, the first distance being less than or equal to the second distance; or moving the robot, in the case that the first target region is occupied, and a first end of the carrying apparatus of the robot is obstructed when a second end of the carrying apparatus is not obstructed, the target movement distance toward a direction where the second end is located, wherein the orientation of the carrying apparatus is the goods pick-and-place direction.

14. A non-transitory computer storage medium, comprising a computer program, wherein the computer program, when being executed by a processor, implements computer executable instructions, wherein the computer executable instructions comprise instructions to control a robot to:

move to a position corresponding to a first target region according to a storage instruction of goods to be stored, wherein the first target region is a storage region corresponding to the goods to be stored, and the first target region is determined according to size information of the goods to be stored and a dynamic goods storage space on a rack corresponding to the goods to be stored;

move toward a direction of an unoccupied region in the first target region, in a case that the first target region is occupied;

obtain a second detection result of a current storage region after the movement is completed and during the movement, wherein the current storage region is a corresponding storage region after the movement of the robot is completed or during the movement of the robot;

determine the current storage region as a second target region, in a case that the current storage region meets a storage condition of the goods to be stored, wherein the second target region is a corresponding storage region after the robot moves; and place the goods to be stored in the second target region.

15. The non-transitory computer storage medium according to claim 14, wherein the computer executable instructions further comprise instructions to control the robot to:

detect the first target region, to obtain a first detection result; and determine that the first target region is occupied, according to the first detection result.

16. The non-transitory computer storage medium according to claim 15, wherein the computer executable instructions comprise instructions to control the robot to:

determine whether a central axis, a first end or a second end of a carrying apparatus of the robot in a goods pick-and-place direction is obstructed, according to the first detection result; and determine that the first target region is occupied, in a case that any one of the central axis, the first end and the second end is obstructed.

17. The non-transitory computer storage medium according to claim 16, wherein the computer executable instructions further comprise instructions to control the robot to:

determine whether there is an obstacle in the first target region, in a case that none of the central axis, the first end and the second end is obstructed; and determine that the first target region is occupied, in a case that there is an obstacle in the first target region.

18. The non-transitory computer storage medium according to claim 14, wherein the computer executable instructions comprise instructions to control the robot to:

determine a first unoccupied region in a first region and a second unoccupied region in a second region, in the case that the first target region is occupied, wherein the first region is a region in the first target region located on a left side of a central axis of a carrying apparatus, the second region is a region in the first target region located on a right side of the central axis of the carrying apparatus, and an orientation of the carrying apparatus is a goods pick-and-place direction; and move the robot a target movement distance toward a direction of the first unoccupied region or the second unoccupied region;

determine, in the case that the first target region is occupied and the central axis of the carrying apparatus of the robot is obstructed by an obstacle, a first distance between a first edge of the obstacle and the central axis and a second distance between a second edge of the obstacle and the central axis, wherein the orientation of the carrying apparatus is the goods pick-and-place direction; and move the robot the target movement distance toward a direction where the first edge of the obstacle is located, the first distance being less than or equal to the second distance; or move the robot, in the case that the first target region is occupied and a first end of the carrying apparatus of the robot is obstructed when a second end of the carrying apparatus is not obstructed, the target movement distance toward a direction where the second end is located, wherein the orientation of the carrying apparatus is the goods pick-and-place direction.

* * * * *